(12) United States Patent  (10) Patent No.: US 8,453,447 B2
Barth et al.  (45) Date of Patent: Jun. 4, 2013

(54) TWO-STAGE EXHAUST GAS TURBOCHARGING ARRANGEMENT FOR AN INTERNAL COMBUSTION ENGINE

(75) Inventors: Wilfried Barth, Saxen (AT); Gerald Gruber, Nussdorf (AT); Stefan Ablinger, Steyr (AT); Werner Mietschnig, Doelsach (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 79 days.

(21) Appl. No.: 13/086,520

(22) Filed: Apr. 14, 2011

(65) Prior Publication Data

US 2011/0185724 A1   Aug. 4, 2011

Related U.S. Application Data

(63) Continuation of application No. PCT/EP2009/006613, filed on Sep. 11, 2009.

(30) Foreign Application Priority Data

Oct. 17, 2008  (DE) .......................... 10 2008 052 170

(51) Int. Cl.
  *F02B 33/44*  (2006.01)
(52) U.S. Cl.
  USPC .......................................................... 60/612
(58) Field of Classification Search
  USPC ............................................. 60/612; 123/562
  See application file for complete search history.

(56) References Cited

U.S. PATENT DOCUMENTS

| 3,576,102 | A | * | 4/1971 | West ................................ 60/602 |
| 4,032,262 | A | * | 6/1977 | Zehnder ........................ 417/409 |
| 4,155,684 | A | * | 5/1979 | Curiel et al. .................. 417/409 |
| 4,344,289 | A |   | 8/1982 | Curiel et al. |
| 5,440,881 | A | * | 8/1995 | Sudmanns et al. .............. 60/612 |
| 5,560,207 | A | * | 10/1996 | Ramsden et al. ............ 60/605.1 |

(Continued)

FOREIGN PATENT DOCUMENTS

| DE | 198 22 874 A1 | 11/1999 |
| DE | 102 30 934 A1 | 1/2004 |

(Continued)

OTHER PUBLICATIONS

DE102006004725, Leopold et al, Aug. 8, 2007, pp. 1-3.*

(Continued)

*Primary Examiner* — Mary A Davis
(74) *Attorney, Agent, or Firm* — Crowell & Moring LLP

(57) ABSTRACT

A two-stage exhaust gas turbocharger for an internal-combustion engine having an exhaust manifold is provided. In the exhaust gas flow direction a first high-pressure turbocharger and a second high-pressure turbocharger are arranged parallel to one another and a low-pressure turbocharger is arranged in series behind the latter. The two high-pressure turbine housings can be arranged on the exhaust manifold on one side and the low-pressure turbine housing can be arranged on the exhaust manifold on the other side. The exhaust gas coming from the high-pressure turbine housings is guided through a flow duct in or on the exhaust manifold to the low-pressure turbine housing. By way of this construction of the two-stage exhaust gas turbocharging, a compact construction is achieved resulting in cost savings.

8 Claims, 3 Drawing Sheets

U.S. PATENT DOCUMENTS

| | | | |
|---|---|---|---|
| 6,378,308 B1* | 4/2002 | Pfluger | 60/612 |
| 6,694,736 B2* | 2/2004 | Pfluger | 60/612 |
| 6,973,787 B2* | 12/2005 | Klingel | 60/612 |
| 7,302,800 B2* | 12/2007 | Klingel | 60/612 |
| 7,360,362 B2* | 4/2008 | Nicolle et al. | 60/612 |
| 2002/0112478 A1* | 8/2002 | Pfluger | 60/612 |
| 2004/0040300 A1* | 3/2004 | Klingel | 60/612 |
| 2004/0118389 A1 | 6/2004 | Shaffer et al. | |
| 2004/0134193 A1* | 7/2004 | Klingel | 60/612 |
| 2006/0070381 A1* | 4/2006 | Parlow et al. | 60/612 |
| 2007/0056283 A1* | 3/2007 | Klingel | 60/612 |
| 2007/0089416 A1* | 4/2007 | Weber et al. | 60/605.2 |
| 2007/0107430 A1* | 5/2007 | Schmid et al. | 60/612 |
| 2007/0169479 A1 | 7/2007 | Nicolle et al. | |
| 2010/0083656 A1* | 4/2010 | Parlow et al. | 60/612 |

FOREIGN PATENT DOCUMENTS

| | | |
|---|---|---|
| DE | 10 2006 004 725 A1 | 8/2007 |
| DE | 10 2006 011 188 A1 | 9/2007 |
| EP | 0 014 778 A1 | 9/1980 |
| EP | 1 136 676 A2 | 9/2001 |
| WO | WO 91/18190 A1 | 11/1991 |
| WO | WO 2008/083769 A1 | 7/2008 |

OTHER PUBLICATIONS

DE102006011188, Hans-Juergen et al, Sep. 13, 2007, pp. 1-3.*
EP1136676, Peter et al, Sep. 26, 2001, pp. 1-3.*
DE10230934, Barth et al, Sep. 7, 2002, pp. 1-4.*
International Search Report dated Oct. 29, 2009 including English=language translation (Six (6) pages).

* cited by examiner

TWO-STAGE EXHAUST GAS TURBOCHARGING ARRANGEMENT FOR AN INTERNAL COMBUSTION ENGINE

CROSS-REFERENCE TO RELATED APPLICATIONS

This application is a continuation of PCT International Application No. PCT/EP2009/006613, filed Sep. 11, 2009, which claims priority under 35 U.S.C. §119 from German Patent Application No. DE 10 2008 052 170.1, filed Oct. 17, 2008, the entire disclosures of which are herein expressly incorporated by reference.

BACKGROUND AND SUMMARY OF THE INVENTION

The invention relates to a two-stage exhaust gas turbocharging arrangement for an internal-combustion engine.

The invention is based on German Published Patent Application DE 10 2006 011 188 A1. From DE 10 2006 011 188 A1, a two-stage exhaust gas turbocharging arrangement is known for an internal-combustion engine having an exhaust manifold. In the flow direction of the exhaust gas of the internal-combustion engine, the exhaust gas turbocharging arrangement has smaller first and second high-pressure turbochargers, which are arranged parallel to one another, and additionally a larger low-pressure turbocharger arranged in series behind the latter. The exhaust manifold, the first high-pressure turbine housing of the first high-pressure turbocharger and the low-pressure turbine housing of the low-pressure turbocharger are mutually connected in an exhaust-gas-bearing manner. In addition, the exhaust manifold can be connected with the second high-pressure turbine housing of the second high-pressure turbocharger in an exhaust-gas-bearing manner by way of a throttling element, while the first high-pressure turbine housing and the low-pressure turbine housing are permanently connected with one another in an exhaust-gas-bearing manner.

By means of the two-stage exhaust gas turbocharging arrangement of the above-mentioned type, very high power densities can be achieved for an internal-combustion engine. Except for relatively high component expenditures and a relatively large size, this arrangement has no disadvantages.

It is an object of the present invention to achieve a design that is as compact as possible (for the purpose of packaging) for a two-stage exhaust gas turbocharging arrangement of the above-mentioned type.

This object is achieved by way of a two-stage exhaust gas turbocharging arrangement for an internal-combustion engine having an exhaust manifold. In the flow direction of an exhaust gas of the internal-combustion engine, the exhaust gas turbocharging arrangement having a first high-pressure turbocharger and a second high-pressure turbocharger arranged parallel to one another, and a low-pressure turbocharger arranged in series behind the latter. The exhaust manifold, a first high-pressure turbine housing of the first high-pressure turbocharger and a low-pressure turbine housing of the low-pressure turbocharger are connected with one another in an exhaust-gas-bearing manner. The exhaust manifold is connectable in an exhaust-gas-bearing manner with a second high-pressure turbine housing of the second high-pressure turbocharger, and the second high-pressure turbine housing and the low-pressure turbine housing are connected with one another in an exhaust-gas-bearing manner. The two high-pressure turbine housings are arrangeable on the exhaust manifold on one side and the low-pressure turbine housing can be arranged on the exhaust manifold on the other side. The exhaust gas coming from the high-pressure turbine housings is guided through a flow duct in or on the exhaust manifold to the low-pressure turbine housing.

As a result of the development according to the invention, a packaging advantage as well as a cost advantage is achieved.

In one preferred aspect of the invention, the first and second high-pressure turbine housings are detachably connectable with the exhaust manifold. This embodiment represents a particularly preferred service-friendly mounting possibility. This may, for example, be a proven screwed connection.

Further aspects according to the invention have the first and second high-pressure turbine housings made in one piece and of a uniform material. Moreover, a first air charge cooler may be provided for the low pressure exhaust gas turbocharger, wherein a low-pressure compressor housing of the low-pressure exhaust gas turbocharger is made in one piece with a housing of the first charge air cooler. These embodiments further reduce the component expenditures and therefore the costs.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, identical reference numbers apply to the same components in FIGS. 1 to 3.

Figure 1:
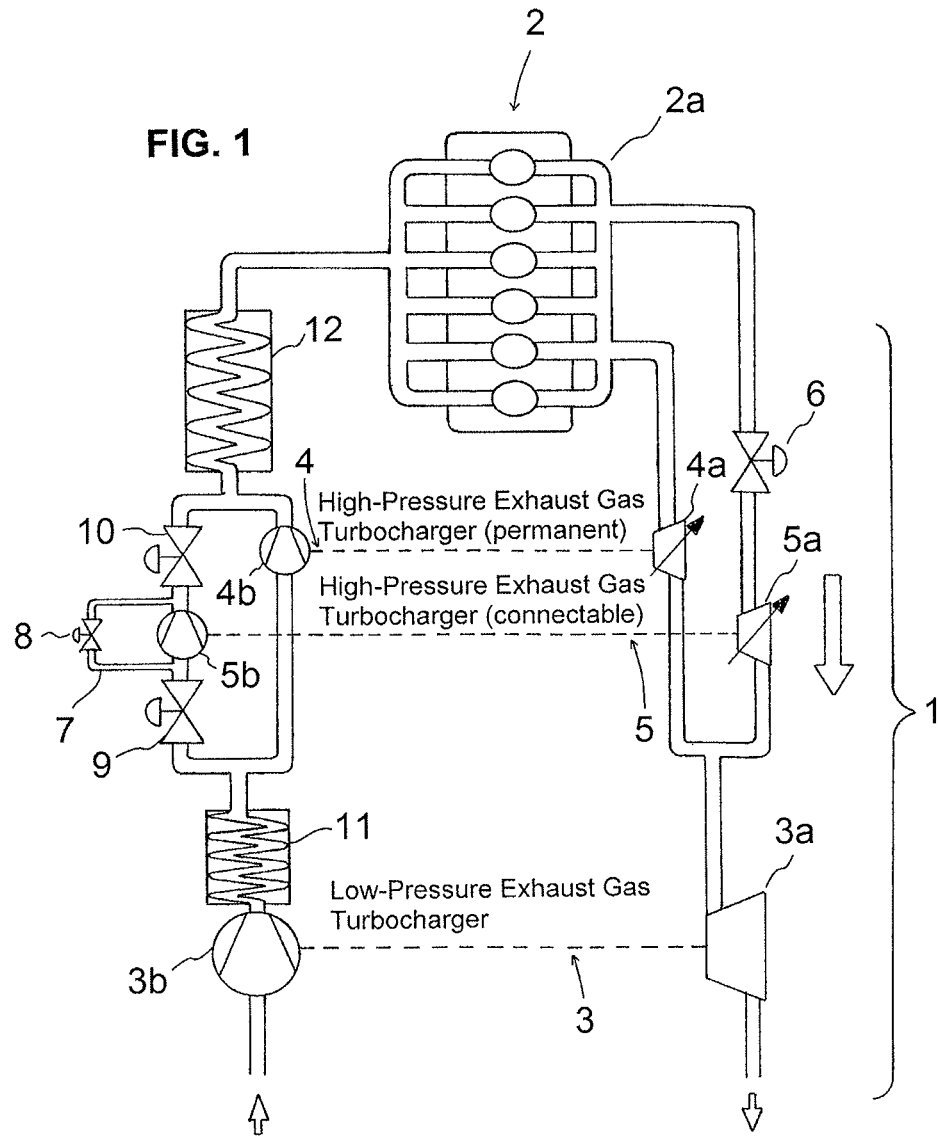
FIG. 1 is a schematic view of an exemplary construction of a two-stage exhaust gas turbocharging arrangement according to the invention for an internal-combustion engine.

FIG. 1 schematically illustrates the construction of a preferred two-stage exhaust gas turbocharging arrangement 1 according to the invention for an internal-combustion engine 2. As an example, the internal-combustion engine 2 is represented as a 6-cylinder internal-combustion engine. Six schematically outlined cylinders of the internal-combustion engine 2 lead into a single exhaust manifold 2*a*. The exhaust manifold 2*a* is permanently connected in an exhaust-gas-bearing manner with a high-pressure turbine housing 4*a* of a high-pressure exhaust gas turbocharger 4. In addition, the exhaust manifold 2*a* can be connected in an exhaust-gas-bearing manner by way of a throttling element 6 (fourth one shown in FIG. 1) with a second high-pressure turbine 5*a* of a second high-pressure exhaust gas turbocharger arranged parallel to the first high-pressure exhaust gas turbocharger 4. The first and the second high-pressure turbine housings 4*a*, 5*a*, in turn, are connected in an exhaust-gas-bearing manner with a low-pressure turbine housing 3*a* of a low-pressure exhaust gas turbocharger 3. The flow direction of the exhaust gas is symbolically indicated by arrows.

As illustrated in FIG. 1, the two-stage exhaust gas turbocharging arrangement 1 is composed on the exhaust gas side of a low-pressure exhaust gas turbocharger 3 as well as of two high-pressure exhaust gas turbochargers 4, 5 arranged parallel to one another. While exhaust gas flows permanently through the first high-pressure exhaust gas turbocharger 4, the second high-pressure exhaust gas turbocharger 5 can be connected by means of the throttling element 6, which can be controlled or automatically controlled. Thus, as described in the following, the feeding of combustion air to the internal-combustion engine is further developed to be variable.

On the intake side of the internal-combustion engine 2, the two-stage exhaust gas turbocharging arrangement 1 is further developed as follows.

The fresh combustion air is taken in by the two-stage exhaust gas turbocharging arrangement 1, again shown by a small arrow at an inlet opening of the intake system. The combustion air first flows through a low-pressure compressor housing 3b of the low-pressure exhaust gas turbocharger 3, is subsequently cooled down in a first charge air cooler 11 and is subsequently distributed to two separate gas-bearing branches. Thus, the combustion air is permanently conveyed through a high-pressure compressor housing 4b of the high-pressure exhaust gas turbocharger 4 and is subsequently cooled by a second charge air cooler 12, which again cools the recompressed and thereby heated combustion air. Subsequently, the combustion air is conveyed into the cylinders of the internal-combustion engine 2 (indicated by ovals).

A second high-pressure compressor housing 5b of the second exhaust gas turbocharger 5 is arranged parallel to the first high-pressure compressor housing 4b in the flow direction of the combustion air downstream of the separation into two separate gas-bearing branches. In the flow direction of the combustion air, a second throttling element 9, which can be controlled or automatically controlled, is arranged in front of the high-pressure compressor housing 5b. A third throttling element 10, which can also be controlled or automatically controlled, is, in turn, arranged in the flow direction of the combustion air downstream of the second high-pressure compressor housing 5b. The second and the third throttling elements 9, 10 are alternatives for the implementation. Between the high-pressure compressor housing 5b as well as the second throttling element 9 and the third throttling element 10, a bypass 7 is provided parallel to the high-pressure compressor housing 5b. A controllable or automatically controllable first throttling element 8, preferably an exhaust gas flap, is also arranged in the bypass 7.

Figure 2:
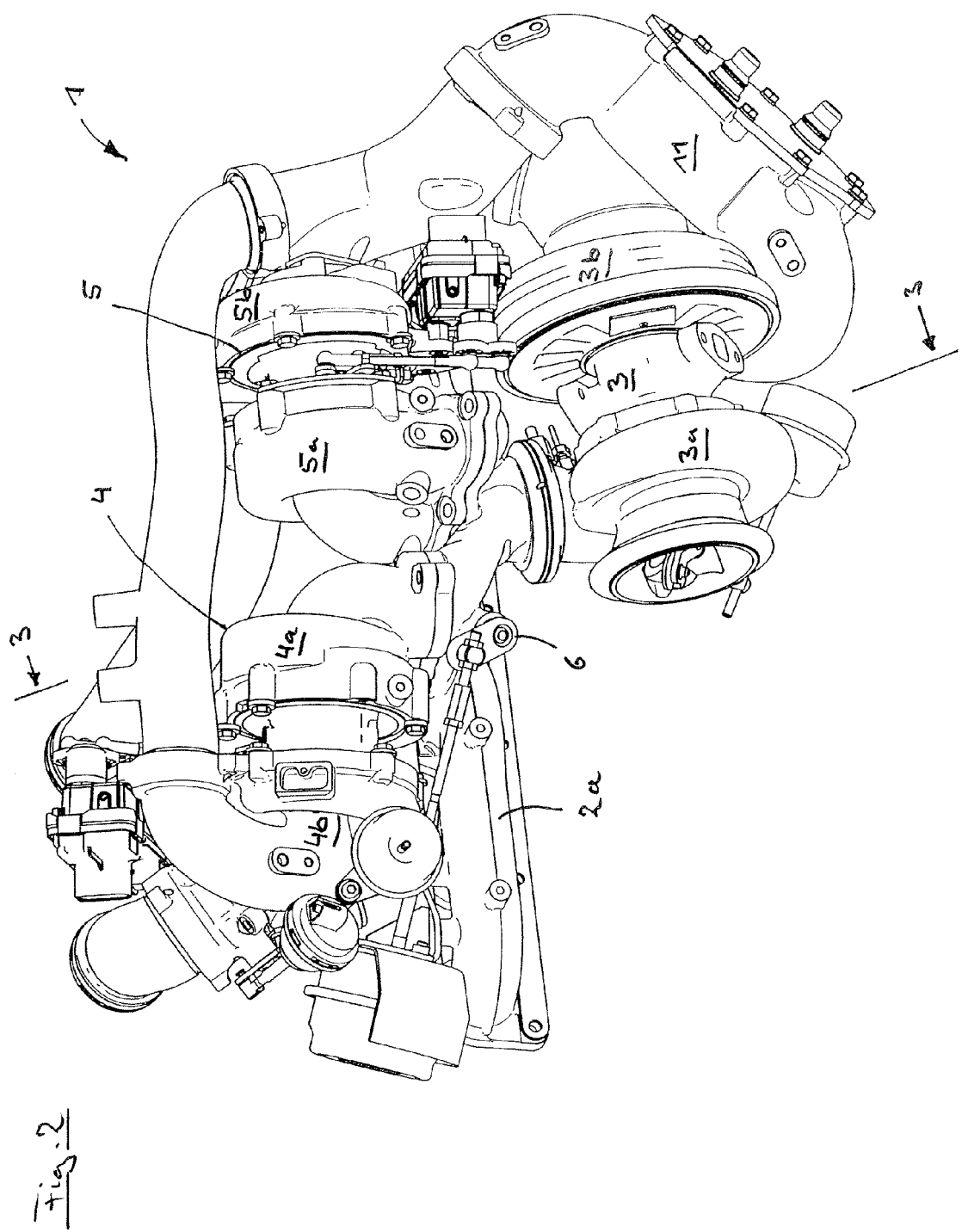
FIG. 2 is a three-dimensional top view of an exemplary two-stage exhaust gas turbocharging arrangement according to the invention.

FIG. 2 is a three-dimensional top view of the two-stage exhaust gas turbocharging arrangement 1, having the components illustrated in FIG. 1, but without the internal-combustion engine 2. FIG. 2 clearly illustrates the compact construction of the two-stage exhaust gas turbocharging arrangement 1 as a result of the further development according to the invention where the two high-pressure turbine housings 4a, 5a can be arranged at the exhaust manifold 2a on one side and the low-pressure turbine housing 3a can be arranged at the exhaust manifold 2a on the other side. The exhaust gas coming from the high-pressure turbine housings 4a, 5a is guided through a flow duct 13 (visible in FIG. 3) in the exhaust manifold 2a to the low-pressure turbine housing 3a.

The housings of the first charge air cooler 11 and of the low-pressure compressor 3b preferably are constructed in one piece and of a uniform material for further minimizing the installation space. Further components are not provided with additional reference numbers because they are mainly ducts which also are not numbered in FIG. 1. Two arrows having the reference number 3 show a section through the two-stage exhaust gas turbocharger arrangement 1, which is illustrated in FIG. 3.

Figure 3:
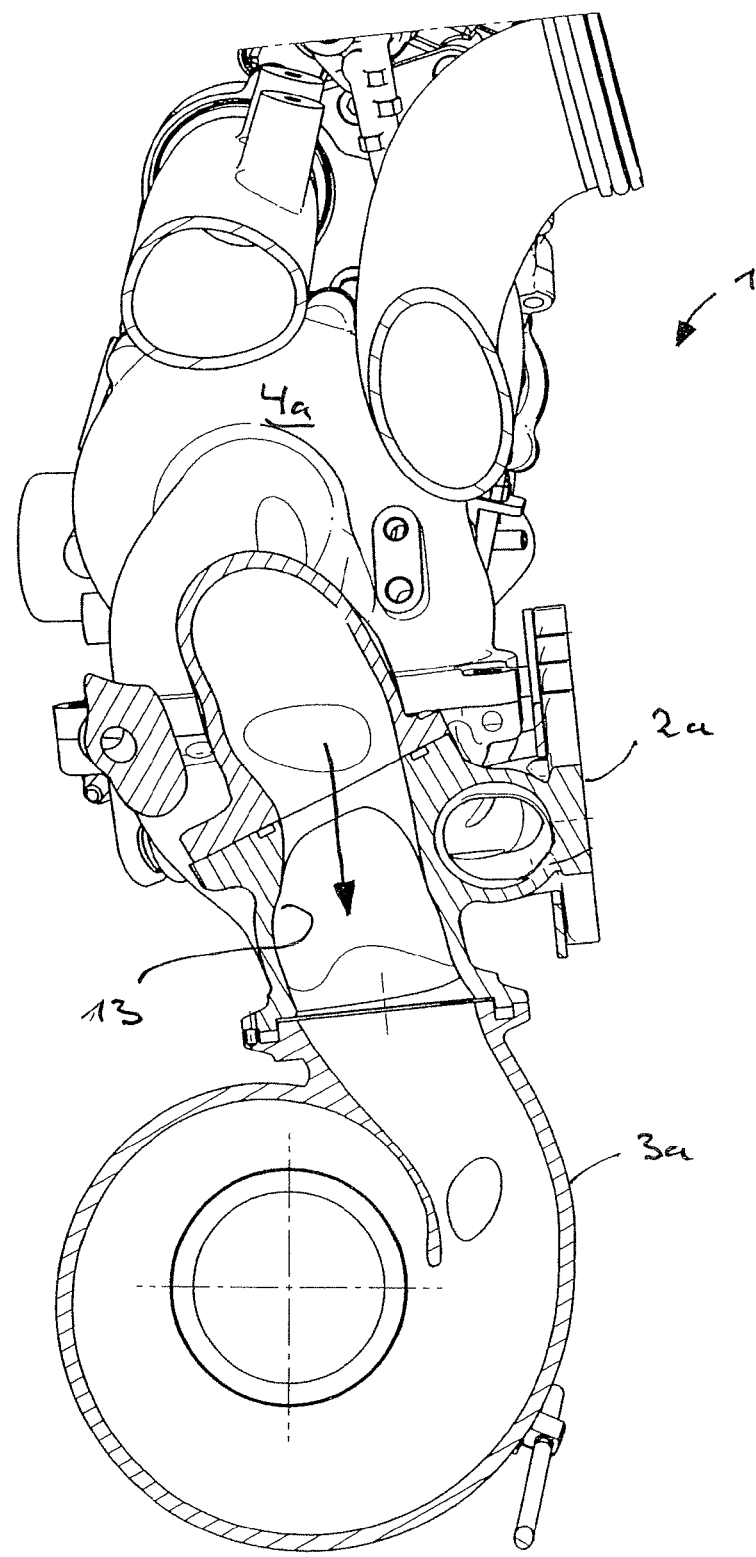
FIG. 3 is a sectional view of the exemplary two-stage exhaust gas turbocharging arrangement according to the invention illustrated in FIG. 2.

FIG. 3 is a sectional view taken along line 3-3 in FIG. 2 of the two-stage exhaust gas turbocharging arrangement from FIG. 2. A flow direction of the exhaust gas from the first high-pressure turbine housing 4a to the low-pressure turbine housing 3a through the flow duct 13 in the exhaust manifold 2a is schematically illustrated by an arrow.

Basic Description of the Arrangement

On the whole, three exhaust gas turbochargers are required—two high-pressure exhaust gas turbochargers 4, 5 of an identical or different size, which are arranged parallel to one another. At least one of the high-pressure exhaust gas turbochargers 4, 5 is preferably constructed with a variable turbine guiding device. For this purpose, a low-pressure exhaust gas turbocharger 3 is connected in series on the input side. An intermediate cooling arrangement for lowering the charge temperature is provided between the low-pressure compressor housing 3b and the high-pressure compressor housings 4b, 5b. The first and the second charge air coolers 11, 12 are used for the intermediate cooling. The second and the third throttling elements 9 and 10, respectively, are situated at the input side and the output side of the second high-pressure compressor housing 5b, which can be connected and disconnected. The second and the third throttling elements 9 and 10 are general valves for the shut-off as well as a bypass pipe. The bypass 7 connects the inlet of the second high-pressure compressor housing 5b with the outlet of the second high-pressure compressor housing 5b also in a connectable manner. On the exhaust gas side, a shut-off valve, i.e., a fourth throttling element 6, is situated in front of the inlet of the therefore connectable and disconnectable second high-pressure turbine housing 5a in order to separate it from the exhaust gas flow.

The operating strategy of the exhaust gas turbocharging arrangement 1 differs depending on the operating point of the internal-combustion engine.

1. Low Rotational Speed Range:

The exhaust valve—the fourth throttling element 6—is closed. The exhaust gas mass flow permanently takes place through the first high-pressure turbine housing 4a and subsequently through the low-pressure turbine housing 3a. The taken-in combustion air mass flow is precompressed by the low-pressure compressor housing 3b, is cooled in the intermediate cooler—the second charge air cooler 11—, and is subsequently compressed in the first permanently operating high-pressure compressor 4b. A defined exhaust gas mass flow takes place through the second connectable high-pressure exhaust gas turbocharger 5 which is therefore maintained at the rotational speed; the second high-pressure compressor housing 5b operates in the circulating-air mode in order to avoid "pumping". Both valves—the second and the third throttling elements 9 and 10—in front of and behind the second connectable high-pressure compressor are closed.

2. High Rotational Speed Range:

The exhaust gas valve—the fourth throttling element 6 is open; the exhaust gas mass flow now takes place through the first and the second high-pressure turbine housing 4a, 5a and subsequently through the low-pressure turbine 3a. The taken-in combustion air mass flow is precompressed by the low-pressure compressor housing 3b, is cooled in the intermediate cooler—the first charge air cooler 11—, and is subsequently compressed in the two high-pressure compressor housings 4b, 5b. The circulating-air valve—the first throttling element 8—is closed; both valves—the second and the third throttling elements 9 and 10—in front of and behind the second connectable high-pressure compressor 5b, are open, as is the exhaust gas valve—the fourth throttling element 6.

| Table of Reference Numbers | |
|---|---|
| 1 | Exhaust Gas Turbocharging Arrangement |
| 2 | Internal-Combustion Engine |
| 2a | Exhaust Manifold |
| 3 | Low Pressure Turbocharger |
| 3a | Low Pressure Turbine Housing |
| 3b | Low Pressure Compressor Housing |
| 4 | First High-Pressure Turbocharger |
| 4a | First High-Pressure Turbine Housing |
| 4b | First High-Pressure Compressor Housing |
| 5 | Second High-Pressure Turbocharger |
| 5a | Second High-Pressure Turbine Housing |
| 5b | Second High-Pressure Compressor Housing |
| 6 | Fourth Throttling Element |
| 7 | Bypass |
| 8 | First Throttling Element |
| 9 | Second Throttling Element |
| 10 | Third Throttling Element |
| 11 | First Charge Air Cooler |
| 12 | Second Charge Air Cooler |
| 13 | Flow Duct |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A two-stage exhaust gas turbocharging arrangement for an internal-combustion engine having an exhaust manifold, comprising:
    a first high-pressure turbocharger having a first high-pressure turbine housing;
    a second high-pressure turbocharger having a second high-pressure turbine housing;
    a low-pressure turbocharger having a low-pressure turbine housing;
    wherein the first and second high-pressure turbochargers are arranged parallel to one another in a flow direction of exhaust gas from the internal-combustion engine;
    wherein the low-pressure turbocharger is arranged in series downstream of the first and second high-pressure turbochargers;
    wherein the exhaust manifold, the first high-pressure turbine housing and the low-pressure turbine housing are connected with one another in an exhaust-gas-bearing manner;
    wherein the exhaust manifold is connectable in an exhaust-gas-bearing manner with the second high-pressure turbine housing;
    wherein the second high-pressure turbine housing and the low-pressure turbine housing are connected with one another in an exhaust-gas-bearing manner;
    wherein the first and second high-pressure turbine housings are arrangeable on the exhaust manifold on one side thereof and the low-pressure turbine housing is arrangeable on the exhaust manifold on another side thereof; and
    a flow duct in or on the exhaust manifold for guiding exhaust gas from the first and/or second high-pressure turbine housings to the low-pressure turbine housing.

2. The two-stage exhaust gas turbocharging arrangement according to claim 1, wherein the first and the second high-pressure turbine housings are detachably connectable with the exhaust manifold.

3. The two-stage exhaust gas turbocharging arrangement according to claim 2, wherein the first and the second high-pressure turbine housings are made in one piece of a uniform material.

4. The two-stage exhaust gas turbocharging arrangement according to claim 3, further comprising:
    a first charge air cooler associated with the low-pressure exhaust gas turbocharger; and
    wherein a low-pressure compressor housing of the low-pressure exhaust gas turbocharger is made in one piece with a housing of the first charge air cooler.

5. The two-stage exhaust gas turbocharging arrangement according to claim 2, further comprising:
    a first charge air cooler associated with the low-pressure exhaust gas turbocharger; and
    wherein a low-pressure compressor housing of the low-pressure exhaust gas turbocharger is made in one piece with a housing of the first charge air cooler.

6. The two-stage exhaust gas turbocharging arrangement according to claim 1, wherein the first and the second high-pressure turbine housings are made in one piece of a uniform material.

7. The two-stage exhaust gas turbocharging arrangement according to claim 6, further comprising:
    a first charge air cooler associated with the low-pressure exhaust gas turbocharger; and
    wherein a low-pressure compressor housing of the low-pressure exhaust gas turbocharger is made in one piece with a housing of the first charge air cooler.

8. The two-stage exhaust gas turbocharging arrangement according to claim 1, further comprising:
    a first charge air cooler associated with the low-pressure exhaust gas turbocharger; and
    wherein a low-pressure compressor housing of the low-pressure exhaust gas turbocharger is made in one piece with a housing of the first charge air cooler.

* * * * *